United States Patent [19]
Smith

[11] 3,974,824
[45] Aug. 17, 1976

[54] SOLAR HEATING DEVICE
[75] Inventor: Ronald H. Smith, San Francisco, Calif.
[73] Assignee: Solergy, Inc., San Francisco, Calif.
[22] Filed: Apr. 9, 1975
[21] Appl. No.: 566,268

Related U.S. Application Data
[63] Continuation-in-part of Ser. No. 496,192, Aug. 9, 1974, abandoned.

[52] U.S. Cl. .............................. 126/271; 250/228
[51] Int. Cl.² ............................................ F24J 3/02
[58] Field of Search ............ 126/270, 271; 237/1 A; 250/228; 350/293

[56] References Cited
UNITED STATES PATENTS

| 735,321 | 8/1903 | Walker | 126/271 |
|---|---|---|---|
| 3,254,703 | 6/1966 | Thomason | 126/121 |
| 3,310,102 | 3/1967 | Trombe | 126/270 |

FOREIGN PATENTS OR APPLICATIONS

| 1,108,431 | 1/1956 | France | 126/271 |
|---|---|---|---|
| 1,245,740 | 10/1940 | France | 126/271 |
| 353,007 | 10/1937 | Italy | 126/270 |

Primary Examiner—Kenneth W. Sprague
Assistant Examiner—James C. Yeung
Attorney, Agent, or Firm—Flehr, Hohbach, Test, Albritton & Herbert

[57] ABSTRACT

Solar heating device utilizing a cylindrical reflector with a spirally extending a section and a parabolically extending section for concentrating solar energy on an axially disposed absorber carrying a fluid to be heated. Substantially all of the energy impinging upon the reflector is reflected inwardly and ultimately strikes the absorber. The curvature of the reflector is such that the device can be mounted in a fixed position and deliver a large amount of concentrated solar energy to the absorber throughout the year. In some embodiments the reflector has an additional spirally extending section adjacent to the first spiral section, and embodiments having a plurality of reflectors and absorbers are also disclosed.

26 Claims, 22 Drawing Figures

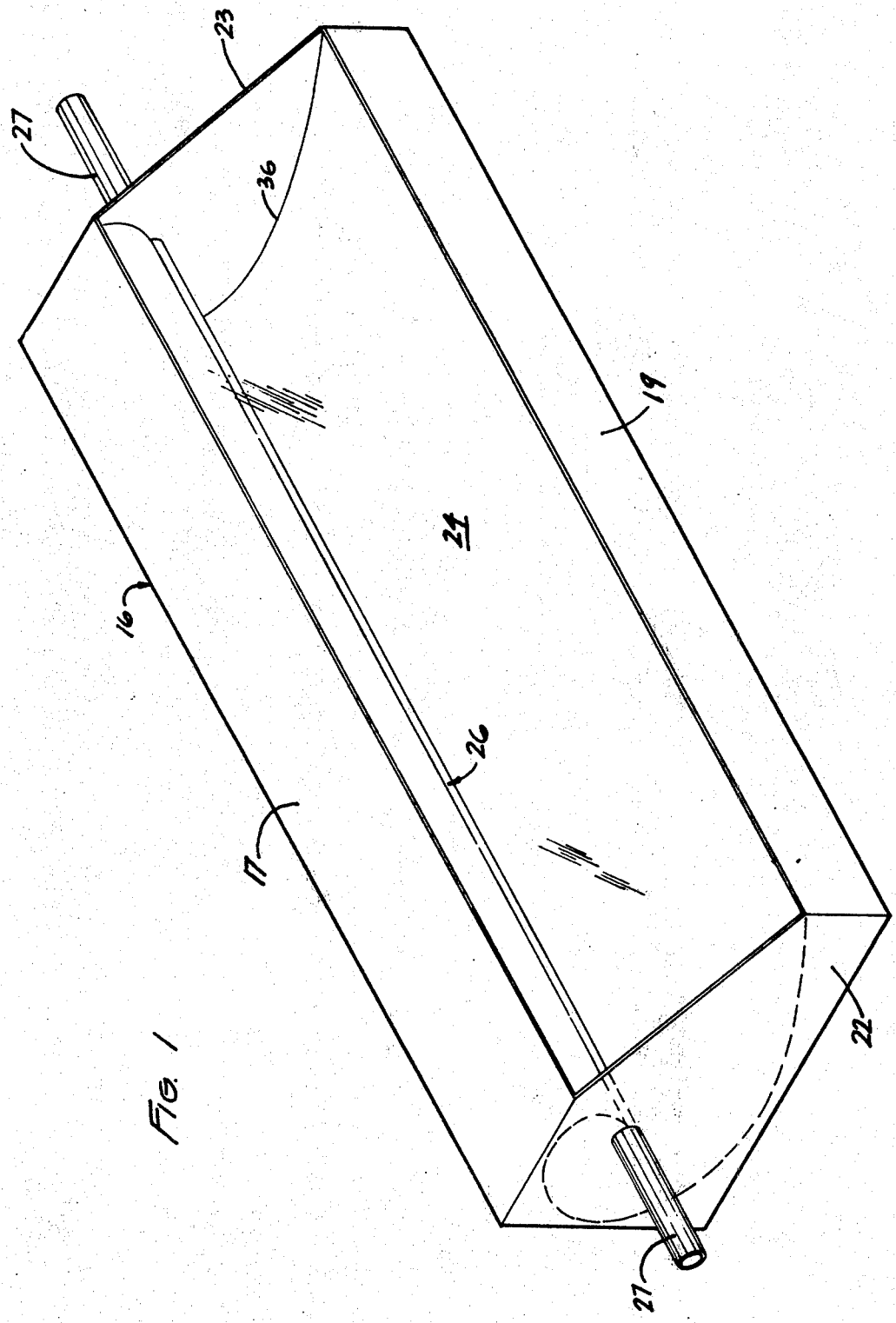

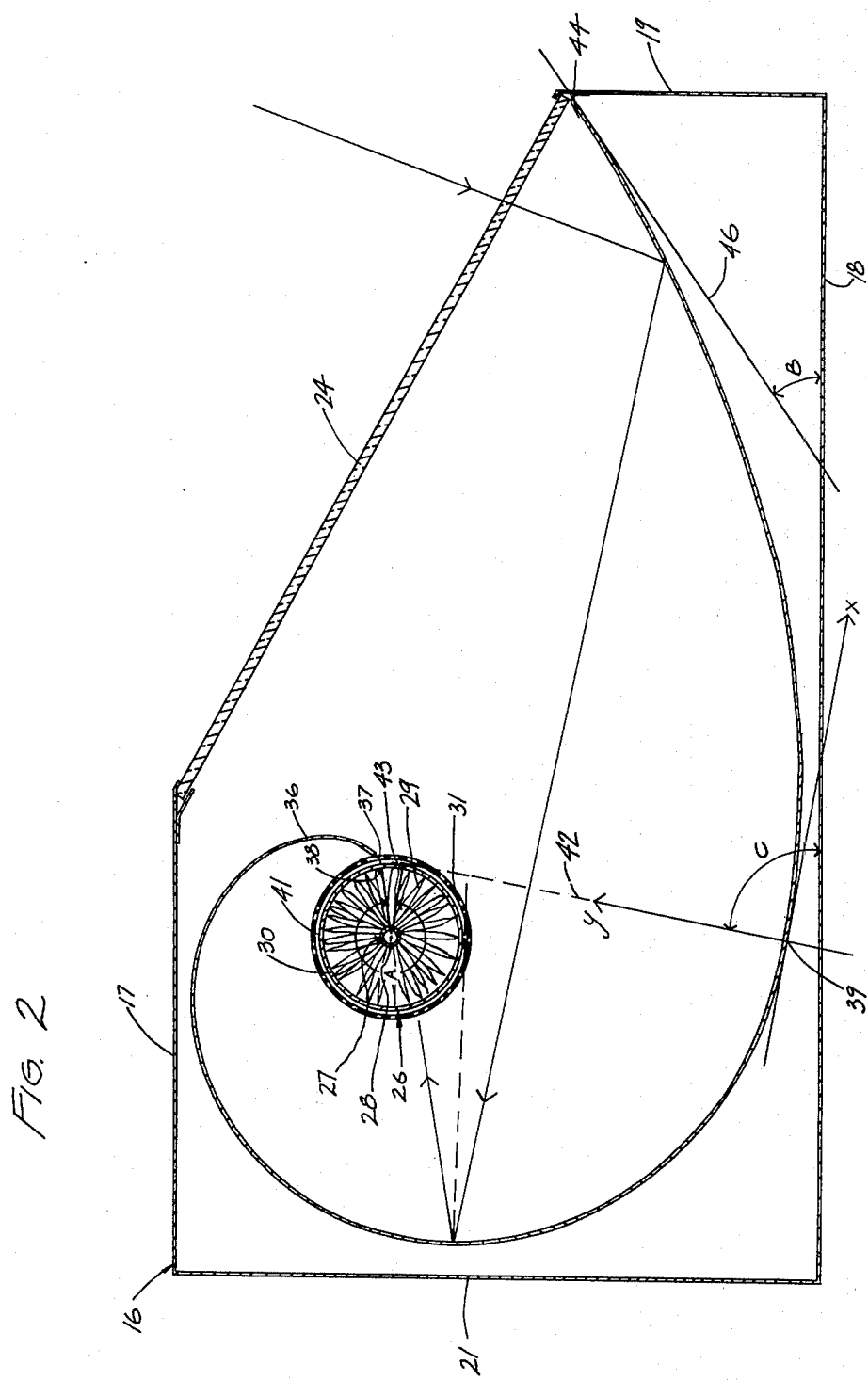

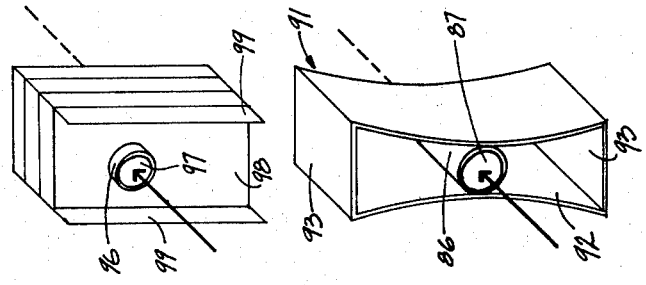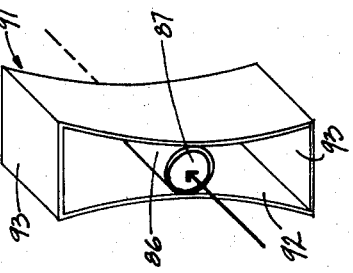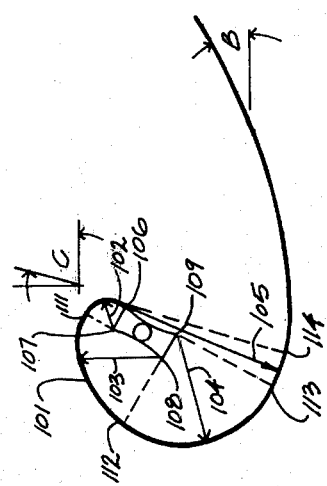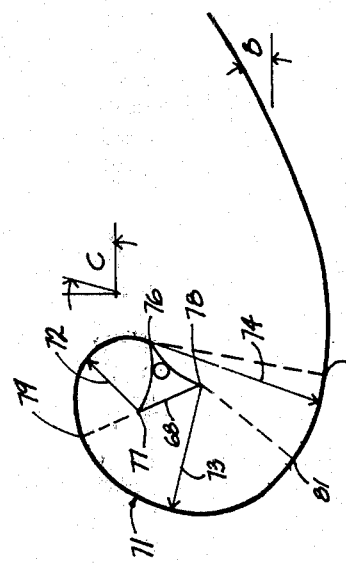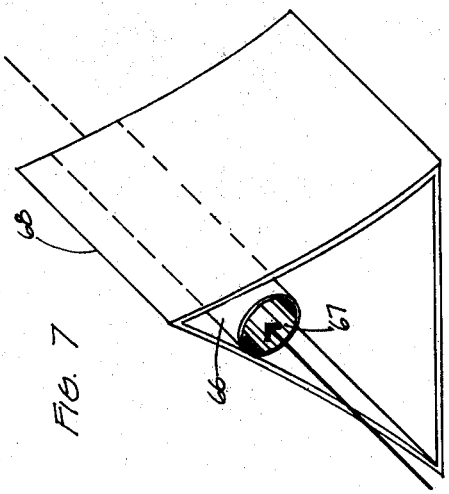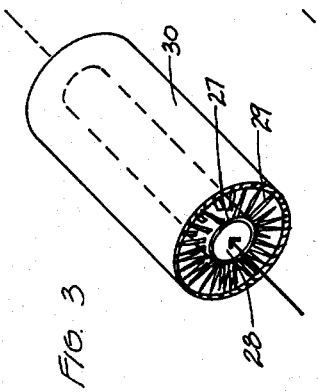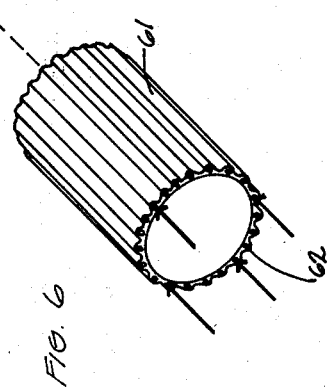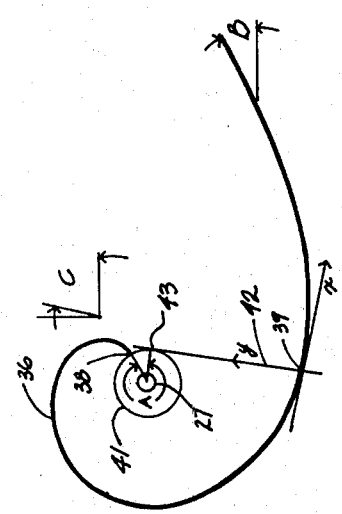

Winter Solstice

Summer Solstice

October; February

August; April

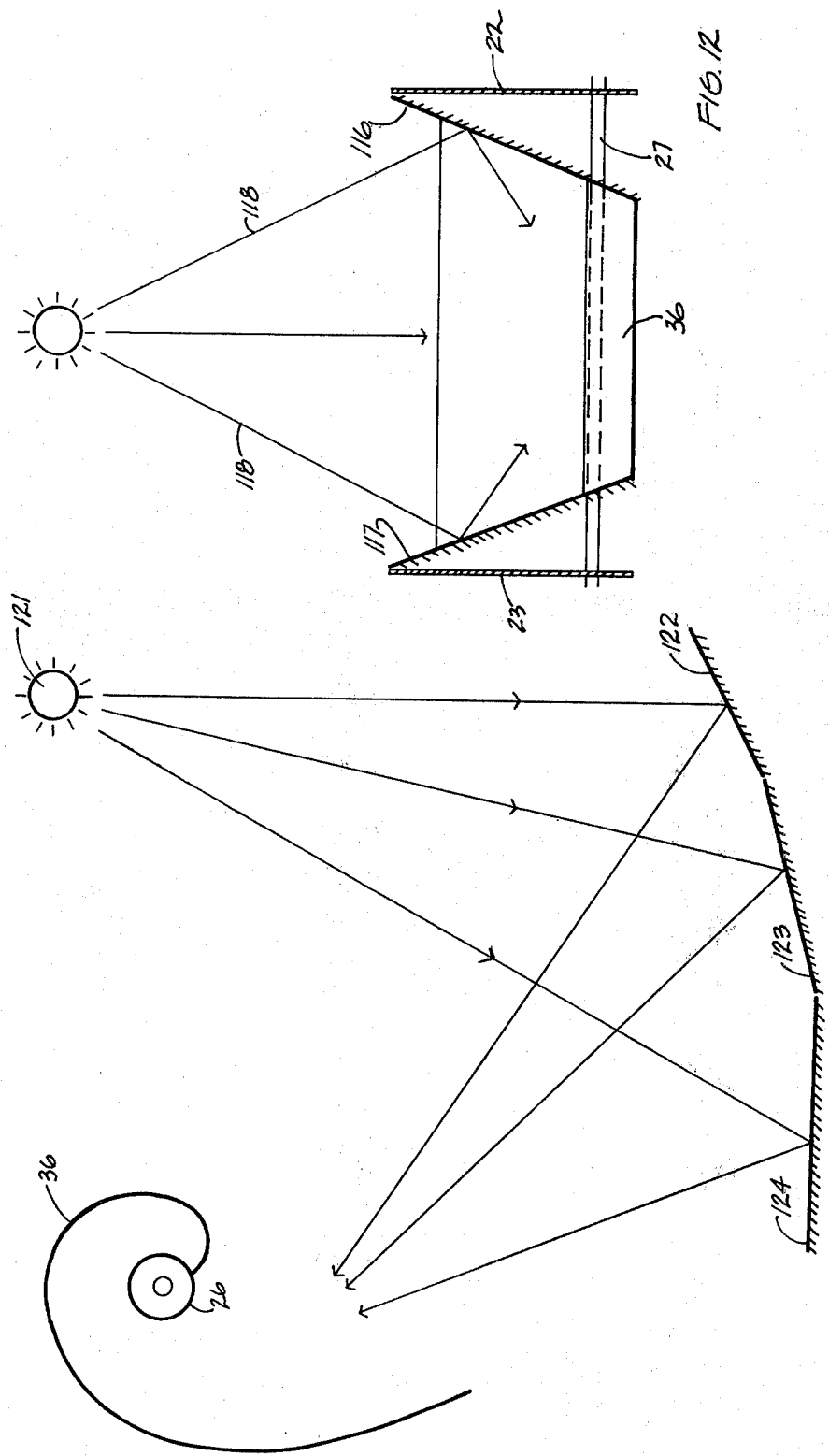

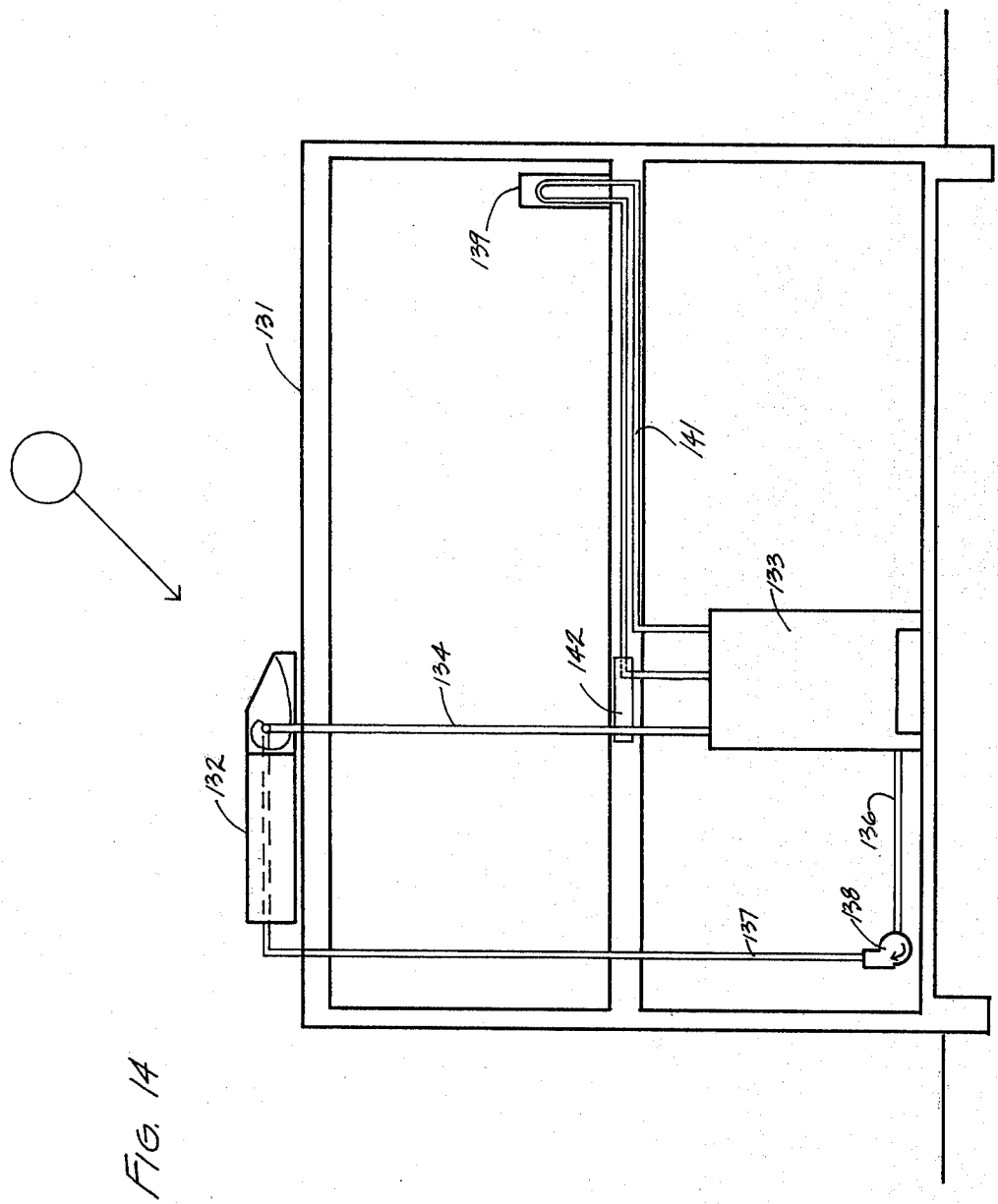

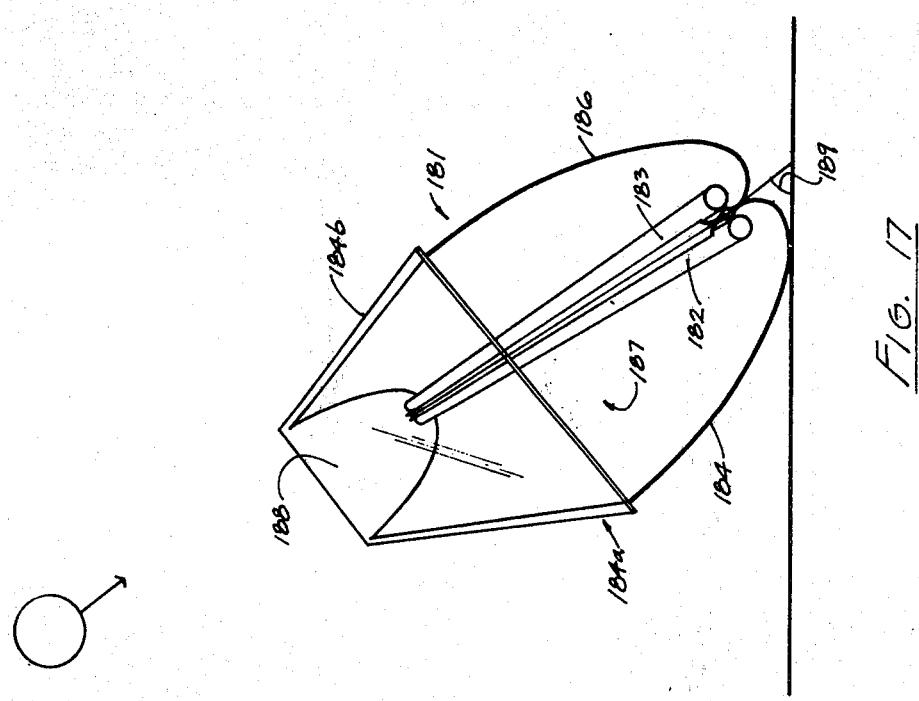
F1G. 17
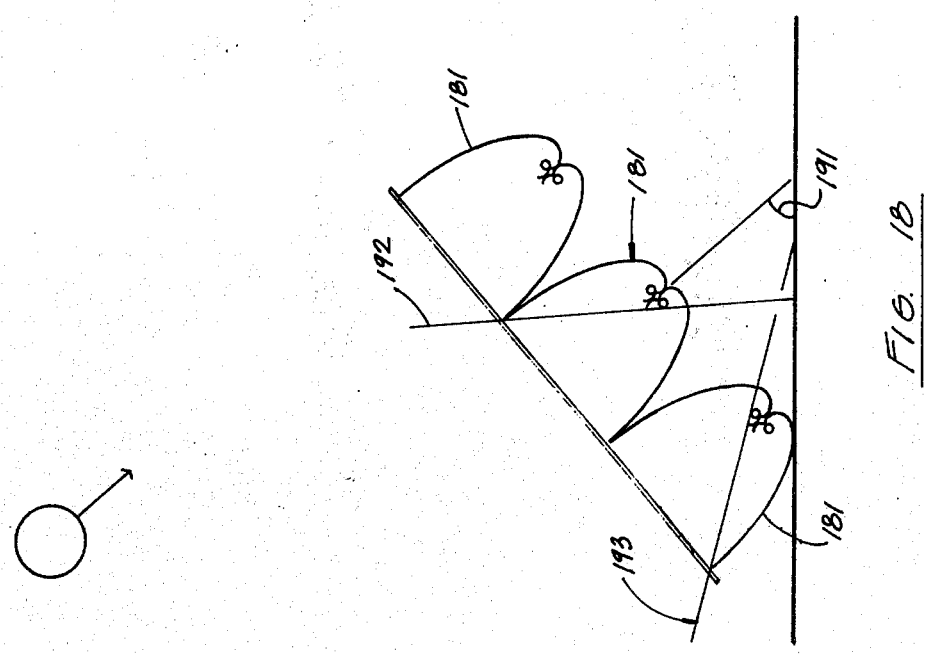
F1G. 18

SOLAR HEATING DEVICE

Cross-Reference to Related Application

This is a continuation-in-part of Ser. No. 496,192, filed Aug. 9, 1974, now abandoned.

BACKGROUND OF THE INVENTION

This invention pertains generally to heating apparatus and more particularly to heating apparatus utilizing solar energy.

In the past, there have been attempts to collect the sun's rays and utilize the heat derived therefrom. In one type of apparatus heretofore provided for this purpose, a liquid to be heated is passed through a heat exchanger which is exposed directly to the sun's rays. Although simple and inexpensive to operate, this type of heating apparatus has a low collection efficiency, and it requires a relatively large heat exchanger to produce an appreciable amount of heat.

Another type of solar heating apparatus heretofore provided includes means for focusing the sun's rays to concentrate the energy contained therein on a suitable collector containing the medium to be heated. Such containers are substantially more efficient than the non-focusing type, but they have a serious disadvantage in that they collect energy from only a narrow angular field and they must be repositioned frequently to keep the sun within this field. These heaters are not suitable for applications, such as the heating and cooling of buildings, where permanent installation without daily or seasonal repositioning is desired.

SUMMARY AND OBJECTS OF THE INVENTORY

The solar heating device of the invention utilizes a cylindrical reflector with a spirally extending section and a parabolic section for concentrating solar energy on an axially disposed absorber carrying a fluid to be heated. Substantially all of the solar energy impinging upon the reflector is directed inwardly and ultimately strikes the absorber. The curvature of the reflector is such that the device can be mounted in a fixed position and deliver a large amount of concentrated solar energy to be the absorber throughout the year. In some embodiments the reflector has an additional spirally extending section adjacent to the first spiral section, and embodiments having a plurality of reflectors and absorbers are also disclosed.

It is in general an object of the invention to provide a new and improved solar heating device.

Another object of the invention is to provide a solar heating device of the above character utilizing a cylindrical reflector with a spiral-shaped section and a parabolic section for concentrating solar energy on an absorber.

Another object of the invention is to provide a solar heating device of the above character which is capable of delivering a large amount of concentrated solar energy to the absorber throughout the year without daily or seasonal repositing.

Another object of the invention is to provide a solar heating device of the above character which collects a high percentage of the solar energy incident thereon and which can produce high temperatures in a working fluid.

Another object of the invention is to provide a solar heating device of the above character which can readily be combined with additional devices of like character.

Additional objects and features of the invention will be apparent from the following description in which the preferred embodiments are set forth in detail in conjunction with the accompanying drawings.

BRIEF DESCRIPTION OF THE DRAWINGS

FIG. 1 is an isometric view of one embodiment of a solar heating device according to the invention.

FIG. 2 is an enlarged cross sectional view of the heating device of FIG. 1.

FIG. 3 is an enlarged isometric view of the absorber of the heating device of FIG. 1.

FIG. 4 is a schematic illustration of the reflector of the heating device of FIG. 1.

FIG. 6 is an isometric view of a portion of a second embodiment of an absorber for use in the heating device of FIG. 1.

FIG. 7 is an isometric view of a portion of a third embodiment of an absorber for use in the heating device of FIG. 1.

FIG. 8 is a schematic illustration of a preferred form of reflector for use with the absorber of FIG. 7 in the heating device of FIG. 1.

FIG. 9 is an isometric view of a portion of a fourth embodiment of an absorber for use in the heating device of FIG. 1.

FIG. 10 is an isometric view of a portion of a fifth embodiment of an absorber for use in the heating device of FIG. 1.

FIG. 11 is a schematic illustration of a preferred reflector for use with the absorbers of FIGS. 9 and 11 in the heating device of FIG. 1.

FIG. 12 is a largely schematic top-plan view of an embodiment of a heating device according to the invention with additional reflectors for preventing loss of energy at the side edges of the main reflector.

FIG. 13 is a schematic illustration of an embodiment of a heating device according to the invention with an auxiliary source of energy and auxiliary reflectors for directing energy from this source to the main reflector.

FIG. 14 is a schematic illustration of a heating device according to the invention installed in a building with thermal storage and heat utilizing equipment.

FIG. 17 is a perspective view of another embodiment of a solar heating unit according to the invention.

FIG. 18 is a side elevational view, largely schematic, of another embodiment of a solar heating device utilizing a plurality of units of the type shown in FIG. 17.

DESCRIPTION OF THE PREFERRED EMBODIMENTS

Figure 5A:
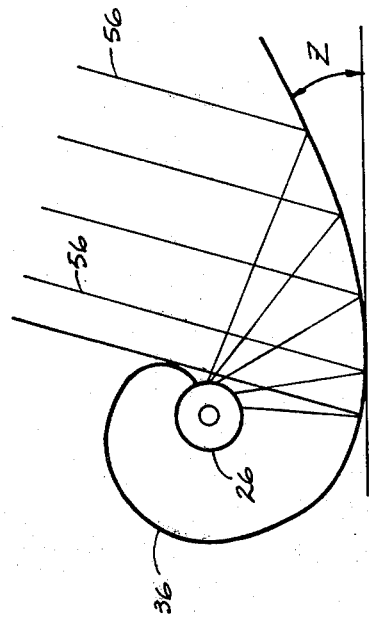
FIGS. 5A–5D illustrate schematically the manner in which the sun's rays are reflected by the reflector of the heating device at different times of the year.

As illustrated in FIGS. 1–2, the heating device includes a housing 16 having a top wall 17, a bottom wall 18, a front wall 19, a rear wall 21, and end walls 22, 23. The walls are fabricated of a rigid material such as sheet metal, wood or plastic, and they are fastened together by suitable means to form a unitary structure. The housing also includes a window 24 which is mounted in an opening formed between top wall 17, front wall 19 and end walls 22, 23. The window is fabricated of a material which is transparent to solar energy, such as glass or a transparent plastic. It permits radiant solar energy to enter the housing and prevents the loss of heat energy through the opening by convection.

An absorber 26 is mounted within housing 16 and supported by end walls 22, 23. The absorber includes a longitudinally extending pipe 27 which defines an axially extending flow passageway 28 for a fluid to be heated. The ends of pipe 27 extend through suitable openings in end walls 22, 23 and provide means for making connections to the passageway externally of the housing. In the embodiment shown in FIGS. 1–3, the absorber also includes a plurality of tines 29 which extend radially from pipe 27. The tines support and are enclosed by a cylindrical shroud 30 of heat conductive material on which solar energy is absorbed. Both the pipe and the tines are fabricated of a thermally conductive material, and the tines provide a plurality of high conductivity paths from the surrounding shroud 30 to the interior pipe.

A second cylindrical shroud 31 is disposed generally coaxially about absorber 26 and encloses the same. This shroud is fabricated of a thermally insulative material which is transparent to solar energy, and it serves to prevent heat loss from the absorber to the housing walls by convection.

A cylindrical reflector 36 is mounted within housing 16 generally parallel to absorber 26 and facing generally toward window 24 for directing solar energy passing through the window toward the absorber. The reflector extends away from the absorber along a spiral path 37 from a point 38 proximate to the outer periphery of the absorber to a point 39 which is spaced from the absorber. In the preferred embodiment, point 38 lies on a circle 41 which coincides with the periphery of absorber shroud 30 and is centered about the axis of passage-way 28. Point 39 lies on a line 42 tangent to circle 41 at a point 43 spaced from point 38 by an angle A. The reflector provides a greater concentration of solar energy on the absorber as angle A is made larger, but the field from which the reflector will accomodate radiation decreases as this angle increases. It has been found that angles on the order of 330° to 360° can be used if desired. Path 37 can be any desired spiral having a radius of curvatore which increases with distance from the absorber. In the preferred embodiment for the generally circular absorber shown in FIGS. 1–3, the spiral is an Archimedes spiral, or involute, in which the radius of curvature increases at a constant rate as the distance from the absorber increases. Such spiral can, for example, be generated by wrapping a piece of string about a circular template of a size corresponding to circle 41 and unwinding the string beginning at point 38. As the string is unwound, its free and describes the desired spiral.

Reflector 36 extends beyond point 39 along a generally parabolic path to a point 44 which is spaced farther from the absorber than is point 39. In the preferred embodiment, the parabolic path is defined by the relationship $y = (\frac{1}{4}F)x^2$, where $x$ and $y$ are Cartesian coordinates in a system having its origin at point 39, with the $y$-axis extending along line 42, and F is the distance along the $y$-axis between point 39 and the outer periphery of the absorber. The embodiment illustrated, circle 41 coincides with the outer periphery of the absorber, and the $y$-axis intersects the absorber at point 43.

As illustrated, the curves of the spiral and parabolic portions of the reflector are matched so that the curvature does not change abruptly at junction point 39. In the preferred embodiment, the location of point 44 is such that a line 46 tangent to the reflector at that point is inclined at an angle B relative to bottom wall 18 corresponding to the zenith angle of the sun at its winter solstice. Similarly the $y$-axis is preferably inclined relative to wall 18 at the angle C corresponding to the zenith angle of the sun at its solstice. The acceptance angle of the reflector, which defines the field of view covered, is equal to the difference between angles C and B, and in the preferred embodiment, the acceptance angle is slightly greater than 46°, corresponding to the range of zenith solar elevation angles between the summer and winter solstices.

Reflector 36 is fabricated of a suitable material such as sheet metal or extruded plastic, and its inner surface is made reflective to solar energy by polishing or coating with a suitable material such as aluminum or silver or by adhering a layer of mirrorized plastic sheet. The reflector is mounted on end walls 22, 23 of the housing and supported by suitable means such as mounting brackets, not shown.

As indicated above fluid to be heated is passed through passageway 28. Suitable fluids include water, Therminol, oil, air and refrigerant gases such as Freon and ammonia.

Operation and use of the heating device of FIGS. 1–4 can be described with reference to FIGS. 5A–5D. It is assumed that the device is installed in a suitable location with the bottom wall 18 of housing 16 disposed horizontally, the axis and window 24 facing in a southernly direction. It is further assumed that the ends of pipe 27 are connected to suitable apparatus for circulating a working fluid through the passageway.

When the sun is at its winter solstice, as indicated in FIG. 5A, its zenith angle Z is equal in the preferred embodiment, to angle B, and the sun's rays are collected throughout the day. Some of the rays strike the absorber directly, as indicated by ray 51. Others, such as ray 52, impinge upon the spiral portion of the reflector and are reflected one or more times in an inward direction until they ultimately strike the absorber. Still other rays, such as ray 53, impinge upon the parabolic portion of the reflector and are reflected one or more times toward the spiral portion from which they are reflected inwardly toward the absorber.

Figure 5B:
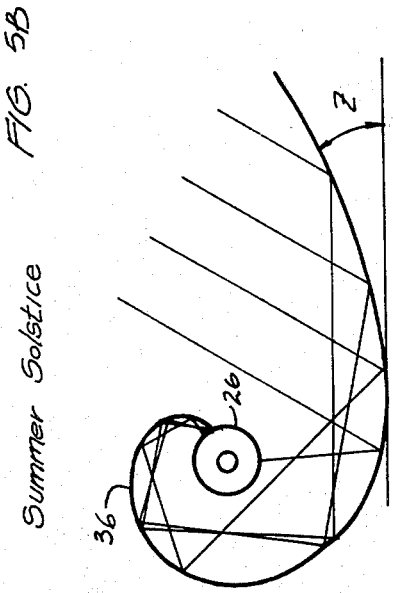

When the sun is at its summer solstice, the sun's zenith angle Z is equal, in the preferred embodiment, to angle C, and the rays impinge only upon the parabolic portion of the reflector, as illustrated by rays 56 in FIG. 5B. These rays are reflected directly to the absorber without striking the spiral portion of the reflector.

Figure 5C:
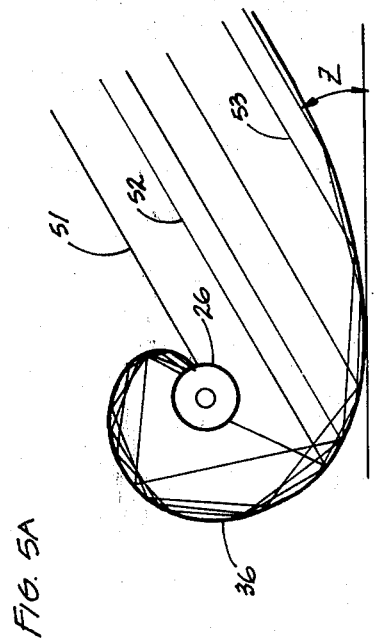
Figure 5D:
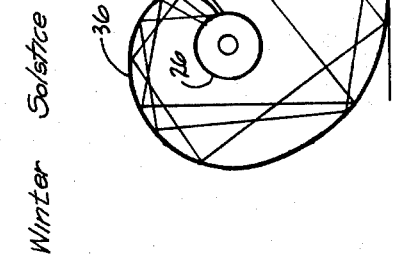

During the periods between the summer and winter solstices, the zenith angle Z of the sun is intermediate between angles B and C, as illustrated in FIGS. 5C and 5D, and the sun's rays impinge upon both the parabolic and spiral portions of the reflector, as well as striking the absorber directly. As at the solstices, the rays impinging upon the reflector are reflected inwardly one or more times, ultimately striking the absorber.

The heat energy derived from the rays striking the absorber is transferred to the fluid in passageway 28. The rays are effectively trapped by the spiral portion of the reflector in that all rays impinging upon this portion are reflected inwardly toward the absorber, and they cannot pass out of the reflector without striking the absorber. This trapping feature provides a high degree of concentration and constitutes a significant improvement over solar energy collectors of the prior art.

FIG. 6 illustrates a second embodiment of an absorber which can be utilized in the heating device of FIGS. 1-4. This absorber comprises a tubular pipe 61 having a plurality of axially extending flow passageways 62 formed therein. The pipe is fabricated of a thermally conductive material, and either the inner or outer surfaces may be corrugated as part of the manufacturing process. This absorber is preferably used with a spiral-shaped reflector of the type shown in FIGS. 1-4.

The absorber shown in FIG. 7 includes a longitudinally extending pipe 66 which defines an axially extending flow passageway 67. Pipe 66 is surrounded by a three-sided shroud 68 having a generally triangular cross section. Both pipe 66 and shroud 68 are fabricated of a thermally conductive material, and the pipe is in direct contact with two sides of the shroud.

A preferred reflector 71 for use with the absorber of FIG. 7 is illustrated in FIG. 8. This reflector is similar to the reflector of FIGS. 1-4 in that it has a spiral-shaped inner portion and a parabolic outer portion. The contour of the spiral-shaped portion of reflector 71 is, however, defined by radii 72-74 of different fixed lengths, rather than a single radius of continuously increasing length. In FIG. 8, the corners of shroud 68 are designated by reference numerals 76-78, and radius 72 is equal in length to the distance between corners 76 and 77. Radius 73 is equal in length to radius 72 plus the distance between corners 77 and 78, and radius 74 is equal in length to radius 73 plus the distance between corners 76 and 78. Between point 76 and a point 79, the spiral extends along a curve of radius 72 centered at corner 77, and between points 79 and 81 the curve has a radius 73 centered at corner 78. Between points 81 and 82, the spiral is defined by radius 74 centered at corner 76. Beyond point 82, which corresponds to point 39 on reflector 36, reflector 71 is parabolic and similar to reflector 36.

The spiral-shaped portion of reflector 71 can be generated by wrapping a piece of string about a template having a contour similar to shroud 68 and unwinding the string, beginning at corner 76. The free end of the string describes the desired spiral as it is unwound.

The absorber shown in FIG. 9 includes a longitudinally extending pipe 86 defining an axially extending flow passageway 87. The pipe is surrounded by a four-sided shroud 91 having oppositely disposed pairs of side walls 92, 93. The pipe and shroud are fabricated of a thermally conductive material, and the pipe is in direct contact with the central portions of shroud walls 92.

The absorber shown in FIG. 10 has a longitudinally extending pipe 96 which defines an axially extending flow passageway 97. A plurality of generally rectangular fins 98 extend radially from pipe 96, and along two opposite sides the edges of the fins are bent to extend in a direction generally parallel to the pipe, as indicated at 99. The pipe and fins are fabricated of a thermally conductive material, and the outwardly facing portions of the fins are painted or coated for maximum absorption. The inwardly facing surfaces of the fins are made shiny to minimize radiative heat losses therefrom.

A preferred reflector 101 for use with the absorbers of FIGS. 9 and 10 is shown in FIG. 11. This reflector extends outwardly from the absorber along the spiral-shaped path defined by radii 102-105. The corners of the absorber are designated 106-109. Radius 102 has a length equal to the distance between corners 106 and 107, and it is centered at corner 107. Radius 103 is equal in length to the sum of radius 102 and the distance between corners 107 and 108, and it is centered at corner 108. Radius 104 has a length equal to the sum of radius 103 and the distance between corners 108 and 109, and it is centered at corner 109. Radius 105 has a length equal to the sum of radius 104 and the distance between corners 106 and 109, and it is centered at corner 106. Between corner 102 and point 111, the curvature of the spiral is defined by radius 102, between points 111 and 112 it is defined by radius 103, between points 112 and 113 it is defined by radius 104, and between points 113 and 114 it is defined by radius 105. Beyond point 114, which corresponds to point 30 on reflector 36, reflector 101 is parabolic and similar to reflector 36.

Operation and use of heating devices having absorbers and reflectors of the type shown in FIGS. 6-11 is similar to that described above. The various absorbers and reflectors described herein are given by way of example only, and other suitable types of reflectors and absorbers, such as a vapor transport heat pipe absorber or absorbers of different shapes, can be utilized in the invention if desired. Also, variations of overall size, variations in axial length to side proportions, other suitable housing shapes and other suitable orientations relative to the sun can be utilized in the invention if desired.

In the embodiment illustrated in FIG. 12, inclined reflectors 116, 117 are provided within housing 18 adjacent to end walls 22, 23 to prevent the loss of energy at the side edges of reflector 36. Reflectors 116, 117 are generally planar, and they are supported by suitable mean such as mounting brackets, not shown. These reflectors are inclined inwardly toward the rear of the housing, and they serve to direct diverging rays, such as rays 118, toward the central portions of reflector 36 and the absorber.

The heating device of the invention can be utilized with an auxiliary source 121 of non-solar energy and an array of mirrors 122-124. These mirrors serve to reflect energy from source 121 to reflector 36, and they can also be used to direct additional solar energy to the reflector.

As illustrated in FIG. 14, the heating device of the invention can be utilized in connection with other heating or cooling apparatus in a building. In this figure, the building is designated generally by reference numeral 131, and the heating device, designated 132, is mounted in a fixed position on the roof of the building. The liquid circulating through the absorber is delivered to a thermal storage unit 133, such as a condenser, located within the building. For this purpose, suitable piping 134 is connected between the pipe at one end of the absorber and the inlet of the condenser. The outlet of the condenser is connected to the other end of the absorber pipe by suitable piping 136, 137, and the fluid is circulated by a pump 138. Within the building, heat energy is transferred from the condenser to equipment which utilizes heat, such as a heater 139, by additional piping 141. Suitable measuring and control equipment shown generally at 142, is provided for regulating the flow rate of the working fluid through the absorber and the rate at which energy is delivered from the condenser.

Figure 16:
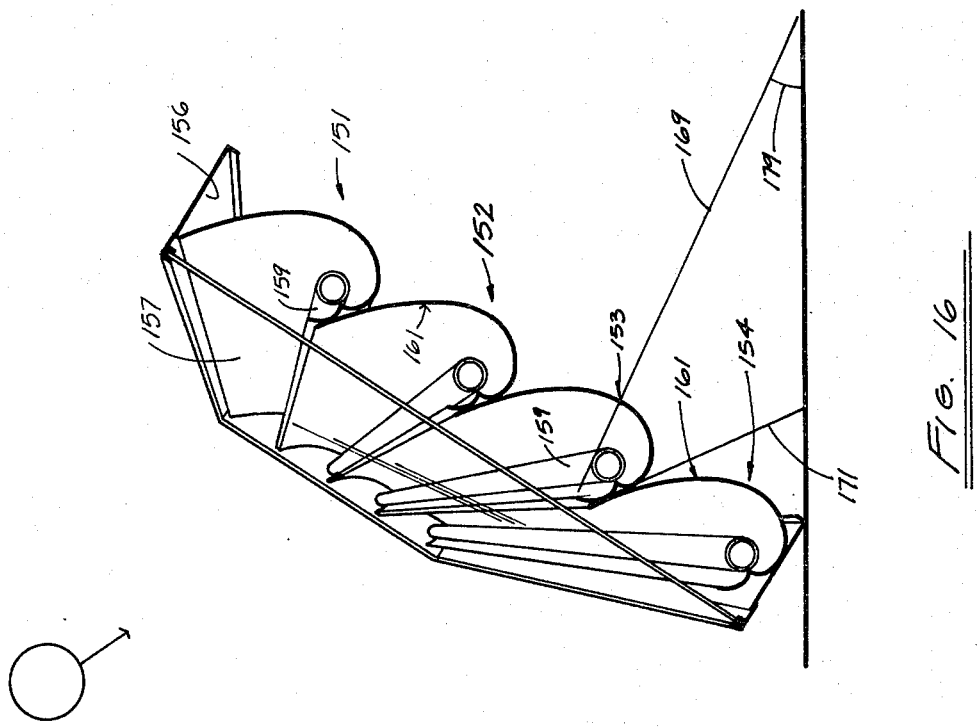
FIG. 16 is a selective view of the embodiment of FIG. 15 oriented at a preferred angle for collecting solar energy during the winter months.
Figure 15:
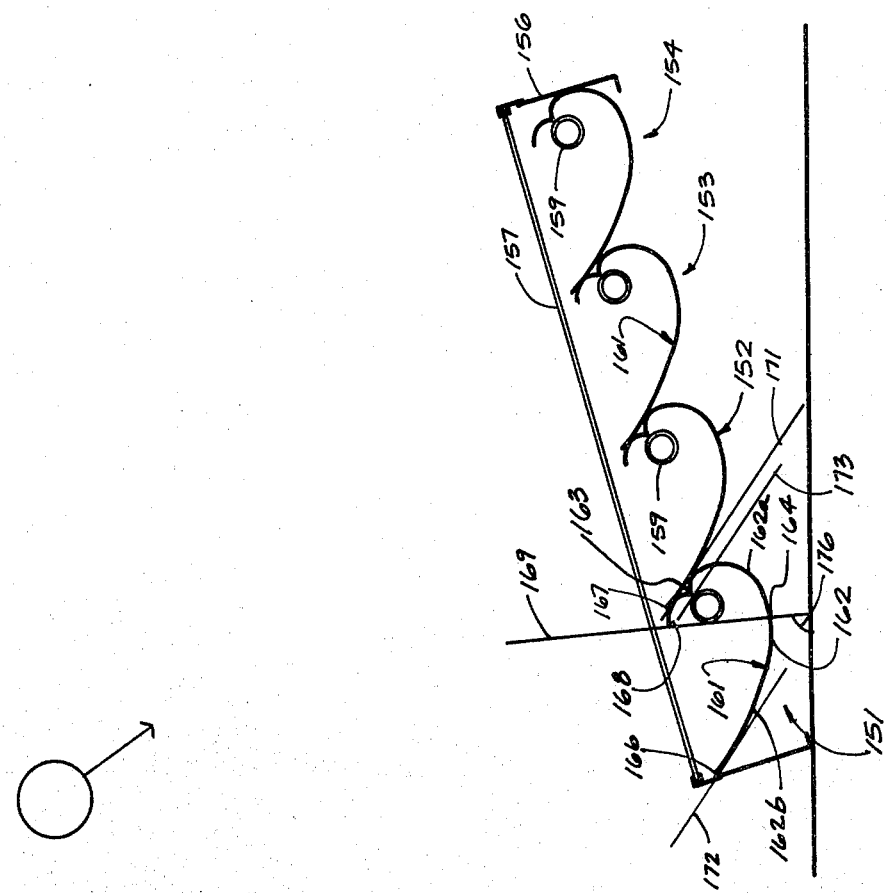
FIG. 15 is a largely schematic side elevational view of another embodiment of a solar heating device according to the invention oriented at a preferred angle for collecting solar energy during the summer months.

In the embodiment of FIGS. 15 and 16, a plurality of collectors 151–154 are nested together and mounted in a framework 156 having a window 157 which is transparent to solar energy. Collectors 151–154 are of similar construction, and each includes an axially extending absorber 159 which carries fluid to be heated. The absorbers can be interconnected with each other and with other heating and cooling apparatus, as desired.

Each of the collectors 151–154 also includes a reflector 161. Each of these reflectors includes a first section 162 having an inner portion 162a and an outer portion 162b. Inner portion 162a extends spirally from a point 163 proximate to the outer periphery of absorber 159 to a point 164 spaced from the absorber. Outer portion 162b extends parabolically from point 164 and terminates in an outer edge 166. At point 164, the curvatures of the inner and outer portions are matched to provide a smooth contour.

Each of the reflectors 161 also includes a second section 167 which extends spirally from point 163 to a point 168 which is spaced from the absorber. As illustrated in FIG. 15, points 164 and 168 lie on a line 169 which is tangent to the absorber, and a line 171 which is tangent to the spiral portions of the two sections is parallel to a line 172 which is tangent to the outer portion of section 162 near outer edge 166. Lines 171 and 172 are also parallel to a line 173 tangent to the absorber at point 163.

When the collectors are nested in the manner illustrated in FIGS. 15 and 16, the spirally extending portions of one reflector are tangent to the outer portion of the parabolically extending portion of the adjacent reflector to provide a simple and rigid construction. The outer edges of the reflector sections lie on a line generally parallel to window 157.

In order to obtain maximum solar collection during the summer, as illustrated in FIG. 15, the device can be oriented in a generally southerly direction, with line 169 inclined at an angle 176 which is slightly higher than the sun's zenith angle at the summer soltice. In this orientation, line 171 is inclined by an angle 177, and the sun's rays enter the collectors during the portion of the day in which the angle of the sun is between horizontal and angle 176.

In order to obtain maximum solar collection during the winter months, the device can be placed in a winter orientation, as illustrated in FIG. 16. In this orientation, line 169 is inclined at an angle 179 which is chosen to be slightly lower than the sun's zenith angle at the winter soltice. With this orientation, the sun's rays enter the collectors during the portion of the day when the angle of the sun is above angle 179. Although the orientation shown in FIG. 16 is optimized for winter, the device will collect solar energy during the entire year. Likewise, when oriented for maximum solar collection during the summer as shown in FIG. 15, the device will collect solar energy during the entire year. In each case a reduced but still significant effective collection area is available during the off season.

FIG. 17 illustrates a solar energy collector 181 comprising a pair of absorbers 182, 183 and a pair of reflectors 184, 186. Each of the absorbers is similar to absorber 159, and each of the reflectors is similar to reflector 161. Absorbers 182, 183 extend in generally parallel directions, and reflectors 184, 186 are mounted back-to-back, with the spirally extending portions of one reflector tangent to the spirally extending portions of the other reflector. The outer portions 184a, 184b of the parabolic portions of the reflectors are spaced apart to define an aperture 187 through which solar energy can enter the collector and be directed toward the absorbers. A window 188 extends between the outer edges of the reflectors and is fabricated of a material transparent to solar energy. As illustrated, the collector of FIG. 17 is inclined at an angle 189 which in the preferred embodiment is chosen to correspond to the latitude of the location at which the collector is installed.

FIG. 18 illustrates a solar heating device utilizing a plurality of collectors 181 of the type illustrated in FIG. 17. These collectors are disposed side-by-side, with the outer edges of the reflectors in each collector being disposed generally in a straight line and the parabolic portions of adjacent reflectors being tangent to each other toward the outer edges. Like the single collector of FIG. 17, this device is preferrably inclined at an angle 191 corresponding to the latitude of the location at which the device is utilized. The maximum angle at which the sun's ray will be collected is defined by a line 192 which passes through the outer edge of the parabolic section of the upper reflector in a collector and is tangent to the lower absorber in the collector. This line also passes through the termination point of the short spiral section of the lower reflector and through the junction of the other spiral portion and the parabolic portion of the lower reflector. The minimum angle at which the sun's rays are collected is defined by a line 193 which passes through the outer edge of the parabolic portion of the lower reflector of a collector and is tangent to the upper absorber in the collector.

Figure 19:
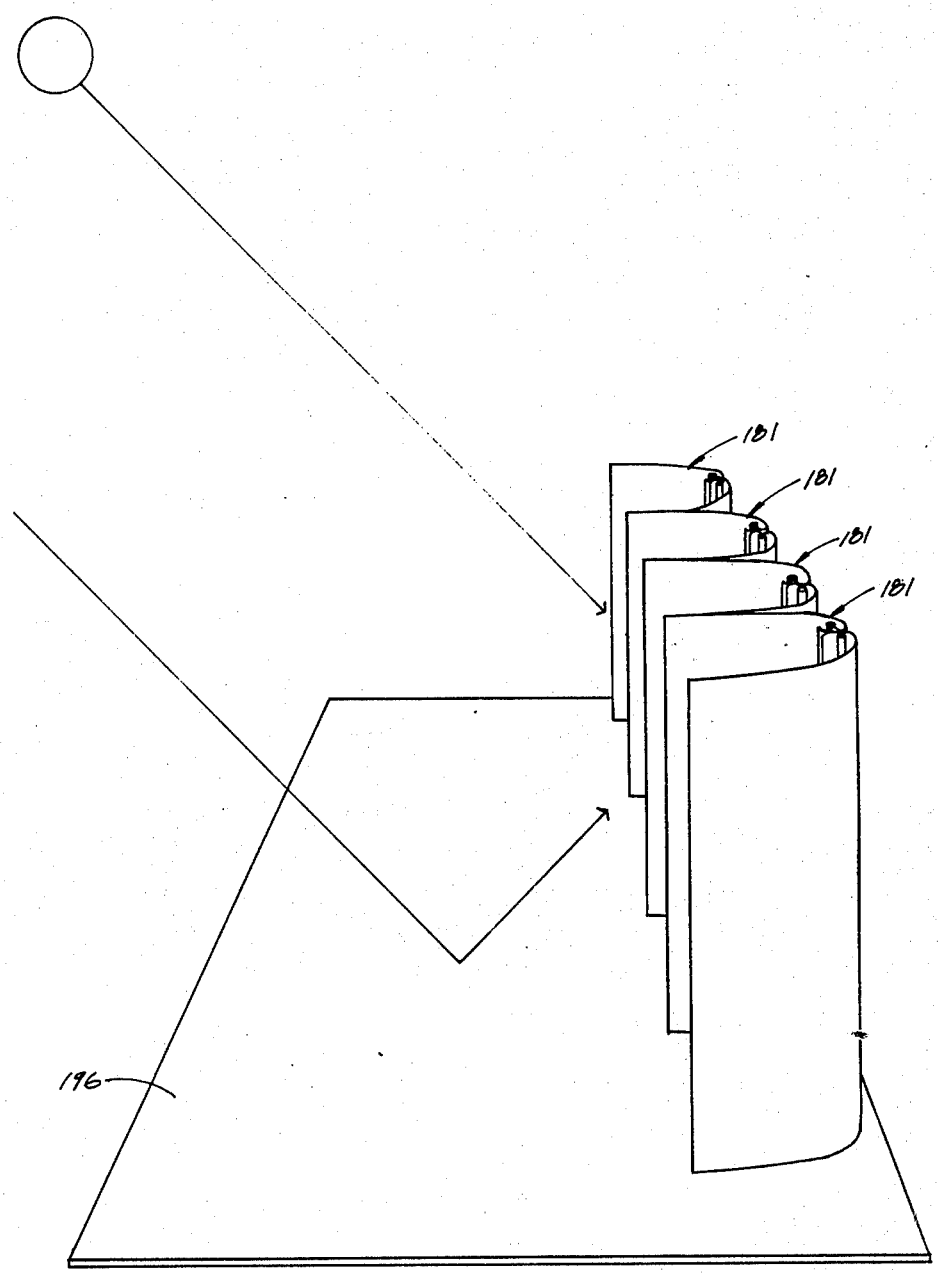
FIG. 19 is a perspective view, largely schematic, of another embodiment of the solar heating device utilizing a plurality of units of the type shown in FIG. 17 in conjunction with an auxiliary reflective surface.

In the embodiment of FIG. 19, a pluarality of collectors 181 of the type illustrated in FIG. 17 are mounted upright on a generally horizontal reflective surface 196. As in the embodiment of FIG. 18, the outer edges of the reflectors are aligned, and the parabolic portions of adjacent reflectors are tangent toward the outer edges. In the northern hemisphere, this device is preferably oriented with the apertures of the collectors facing south. As illustrated, the sun's rays can enter the collectors either directly or by reflection from the surface 196.

It is apparent from the foregoing that a new and improved solar heating device has been provided. While only the presently preferred embodiments have been described herein, as will be apparent to those familiar with the art, certain changes and modifications can be made without departing from the scope of the invention as defined by the following claims.

What is claimed is:

1. In a solar heating device, an absorber having means defining an axially extending flow passageway for carrying fluid to be heated and a cylindrical reflector for concentrating solar energy on the absorber to heat the fluid in the passageway, said reflector being disposed along a path extending spirally from a first point proximate to the outer periphery of the absorber to a second point spaced a predetermined distance from the absorber and parabolically from the second point to a third point spaced from the absorber by a distance greater than the predetermined distance, whereby solar energy impinging upon the reflector is reflected inwardly and ultimately strikes the absorber.

2. The solar heating device of claim 1 wherein the reflector has an acceptance angle on the order of 46° defined by the intersection of a line tangent to the reflector at the third point and a line generally tangent to the absorber passing through the second point.

3. The solar heating device of claim 1 wherein the first point is disposed on a circle centered about the axis of the passageway, and the second point is disposed on a line extending tangentially of the circle at a point spaced from the first point by an angle on the order of 330° to 350°.

4. The solar heating device of claim 3 wherein the reflector extends outwardly from the second point along a path defined by the relationship $y = (¼F)x^2$, where $y$ is the distance of a point on the path from the second point in a direction parallel to the tangentially extending line, F is the distance between the second point and the intersection of the tangentially extending line with the absorber, and $x$ is the distance of the point on the path from the second point in a direction normal to the tangentially extending line.

5. The solar heating device of claim 1 wherein the absorber includes a conduit defining the passageway and thermally conductive means disposed externally of the conduit and in contact therewith.

6. The solar heating device of claim 1 further including a shroud surrounding the absorber, said shroud being fabricated of a thermally insulative material which is transparent to solar energy.

7. The solar heating device of claim 1 together with at least one additional reflector for directing energy toward the first named reflector.

8. The solar heating device of claim 1 together with a non-solar radiant heat source for supplying energy to the reflector.

9. The solar heating device of claim 1 wherein the reflector extends along an Archimedes spiral between the first and second points.

10. The solar heating device of claim 1 together with heat storage means and means for transferring the fluid between the passageway in the absorber and the storage means.

11. In a solar heating device, a housing having a window transparent to solar energy, an absorber mounted within the housing including an elongated flow passageway for fluid to be heated, and a cylindrical reflector mounted within the housing generally parallel to the absorber and facing generally toward the window for directing solar energy passing through the window toward the reflector, said reflector being disposed along a path extending spirally through an angle on the order of 330° to 350° from a first point proximate to the outer periphery of the absorber to a second point spaced a predetermined distance from the absorber and extending parabolically from the second point to a third point spaced from the absorber by a distance greater than the predetermined distance.

12. The solar heating device of claim 11 wherein the reflector has an acceptance angle on the order of 46° defined by the intersection of a line tangent to the reflector at the third point and a line generally tangent to the absorber passing through the second point.

13. The solar heating device of claim 11 further including a shroud surrounding the absorber, said shroud being fabricated of a thermally insulative material which is transparent to solar energy.

14. The solar heating device of claim 11 together with at least one additional reflector for directing energy toward the first named reflector.

15. The solar heating device of claim 11 together with a non-solar radiant heat source for supplying energy to the reflector.

16. The solar heating device of claim 11 wherein the reflector extends along an Archimedes spiral between the first and second points.

17. The solar heating device of claim 11 together with heat storage means and means for transferring the fluid between the passageway in the absorber and the storage means.

18. A solar heating device having an absorber defining an axially extending flow passageway for carrying fluid to be heated and a cylindrical reflector for directing solar energy to the absorber, characterized in that the reflector includes a first section comprising an inner portion extending spirally from a point proximate to the periphery of the absorber and an outer portion extending parabolically outward from the inner portion and a second section extending spirally from the point proximate to the periphery of the absorber to a point generally opposite to the inner portion of the first section.

19. The solar heating device of claim 18 wherein the inner portion of the first section of the reflector and the second section of the reflector are tangent to a line extending in a direction generally parallel to a tangent to the outer portion of the first section at a point toward the outer edge of the first section.

20. The solar heating device of claim 18 wherein the inner portion of the first reflector section and the second reflector section terminate at points on a line tangential to the absorber between the points.

21. In a solar heating device, first and second absorbers defining generally parallel axially extending flow passageways, a first generally cylindrical reflector having a first section including an inner portion which extends spirally from a point proximate to the first absorber and an outer portion which extends parabolically from the inner portion, the first reflector also having a second section which extends spirally from the point proximate to the first absorber, and a second generally cylindrical reflector having first and second sections extending spirally from a point proximate to the second absorber and disposed tangentially of the outer portion of the first section of the first reflector, the second section of the second reflector having an outer portion extending parabolically from the spirally extending portion thereof and generally parallel to the outer portion of the first section of the first reflector.

22. In a solar energy collector, first and second absorbers defining generally parallel axially extending flow passageways, and first and second generally cylindrical reflectors each comprising first and second sections extending spirally in opposite directions from a point proximate to the periphery of respective ones of the absorbers to points spaced from the absorbers, the first sections of the reflectors also including outer portions which extend parabolically from the points spaced from the absorbers, the two reflectors being disposed back-to-back with the spirally extending portions of the first reflector tangent to the spirally extending portions of the second reflector and the outer edges of the parabolic portions spaced apart to define an aperture through which solar energy can enter the collector and be directed toward the absorbers.

23. The solar energy collector of claim 22 further including a window transparent to solar energy extending between the outer edges of the reflectors.

24. The solar energy collector of claim 22 wherein the spirally extending portions of the first reflector and the parabolically extending portion of the second reflector terminate on a line tangential to the first absorber.

25. A solar heating device comprising a plurality of solar energy collectors of the type defined by claim 22 disposed side by side, with the outer edges of the reflectors in each collector being disposed generally in a straight line and the parabolic portions of adjacent reflectors being tangent to each other.

26. The solar heating device of claim 25 wherein the collectors are oriented in an upright position with the absorbers and reflectors extending vertically and wherein a generally planar reflective surface is disposed beneath the collectors.

* * * * *